G. LISPENARD.
COTTON HARVESTER.
APPLICATION FILED DEC. 20, 1907.

1,041,309.

Patented Oct. 15, 1912.

G. LISPENARD.
COTTON HARVESTER.
APPLICATION FILED DEC. 20, 1907.

1,041,309.

Patented Oct. 15, 1912.

Witnesses
Inventor
George Lispenard.
By his Attorney

G. LISPENARD.
COTTON HARVESTER.
APPLICATION FILED DEC. 20, 1907.

1,041,309.

Patented Oct. 15, 1912.
9 SHEETS—SHEET 5.

Fig. 6.

Witnesses:

Inventor
George Lispenard
By his Attorney

G. LISPENARD.
COTTON HARVESTER.
APPLICATION FILED DEC. 20, 1907.

1,041,309.

Patented Oct. 15, 1912.

Witnesses:
C. W. Benjamin
G. I. Curnow

Inventor
George Lispenard
By his Attorney
Joseph L. Levy

G. LISPENARD.
COTTON HARVESTER.
APPLICATION FILED DEC. 20, 1907.

1,041,309.

Patented Oct. 15, 1912.

UNITED STATES PATENT OFFICE.

GEORGE LISPENARD, OF NEW YORK, N. Y., ASSIGNOR TO SOLOMON K. LICHTENSTEIN, TRUSTEE, OF NEW YORK, N. Y.

COTTON-HARVESTER.

1,041,309.   Specification of Letters Patent.   Patented Oct. 15, 1912.

Application filed December 20, 1907. Serial No. 407,323.

*To all whom it may concern:*

Be it known that I, GEORGE LISPENARD, a citizen of the United States, and a resident of the borough of Brooklyn, city of New York, in the county of Kings and State of New York, have invented a new and useful Improvement in Cotton-Harvesters, of which the following is a specification.

My improvements relate to harvesters for picking cotton, and they relate to a machine of the general character shown in Letters Patent issued to me on the 28th day of February, 1905, and numbered 783,792, and also in my copending application filed the 11th day of September, 1906, Ser. No. 234,092.

The object of the invention shown and described in this case is to improve upon the invention set forth in said patent and said application, which object is accomplished by providing a longer run for the pickers while engaged in extracting the cotton from the bolls and also in providing the pickers with a suitable mounting so that they may be adjusted to correspond to the cotton on which they are operating, and in other details, as will appear below.

For a more particular description of my invention, reference is to be had to the accompanying drawings, forming a part hereof in which.

Throughout the various views of the drawings, similar reference characters designate similar parts.

My improved harvester 1 has a longitudinal frame 2 carried high above the steering wheels 3 and the driving wheels 4 by suitable braces and supports 5 and 6 respectively. The wheels 3 are mounted similarly to the front wheels of bicycles and are provided with forks 7, each of which straddles a wheel 3, which is held therein by a suitable axle 8, in any conventional form or convenient way, and extending upwardly from the fork 7 is a vertically disposed shaft 9 suitably journaled in a block 10 to which the lower ends of the braces 5 are attached and at its upper end, it is journaled in a block 11 fixed to the frame 2 in any suitable manner.

Each of the shafts 9 has a forwardly extending arm 12, and these arms 12 are united by a link 13. These arms 12 are fixed to their respective shafts 9 so that the angular movement of one is always identical with the angular movement of the other. One of the shafts 9 is extended upwardly above the link 12 and a sprocket wheel 14 is fixed thereon, which sprocket wheel 14 is driven by a chain 15 that runs to a second sprocket wheel 16 fixed to the hollow shaft 17 of the steering wheel 18, which shaft is suitably supported from the frame 2 by a brace 19 at its upper end and a block 20 at its lower end. From this it is apparent that by turning the wheel 18, the harvester may be steered about the same as an ordinary automobile.

The harvester is driven by any suitable means, but preferably by an ordinary hydrocarbon engine 21 which may be in any suitable form, such as is used in an automobile, and this engine is provided with the usual fly-wheel 22 on its crank shaft 23. This crank shaft 23 has a gear 24 which drives the gear 25 on the cam shaft as is customary in these hydro-carbon motors. The shaft 23 also has a journal block or pillar 26 supported from the frame 2 by any suitable means and between this journal block 26 and the engine 21 is mounted a sprocket wheel 27 which is fixed to the shaft 23 and revolves with it. A chain 28 is carried by its sprocket wheel 27, which chain 28 passes over another sprocket wheel 29, which is fixedly mounted on the main shaft 30 of the harvester, which shaft 30 is journaled at each end in any suitable bearing block 31 fixed to the top of the frame 2. The sprocket wheel 29 is preferably larger than the sprocket wheel 27 so that this will cause the main shaft 30 to revolve with a much smaller angular velocity than the crank shaft 23. The shafts 23 and 30 are parallel and run transversely of the machine.

On the main driving shaft 30 are mounted a number of sprockets (see Fig. 9) which are loosely mounted and these sprockets are numbered 32, 33 and 34, respectively. Each of these sprocket wheels is provided with integral crown-teeth at one side which are adapted to engage similar teeth on a collar 35. As these collars are all identical, a description of one will answer for all. Each of these collars 35 is mounted on the shaft 30, with a key and slot connection so that it can slide for a short distance in the direction of the axis of the shaft 30 but partakes of all its angular movements, and the exterior surfaces of these collars 35 are each provided with an annular groove adapted to receive an inwardly extending lug 36. These lugs 36 are fixedly held on the levers 37, 38 and 39, respectively, so that by oscillating these levers a slight distance in the vertical plane of the axis of the shaft 30, the collars may be thrown over into or out of engagement with the respective crown teeth on the sprocket wheels, the lever 37 controlling the sprocket wheel 32, the lever 38, the sprocket wheel 33, and the lever 39, sprocket wheel 34, each bearing block being controlled by its respective lever so that it may be thrown either into or out of fixed relation with the shaft 30, as desired. The sprocket wheels 33 and 34 are also provided with collars 40 and 41, on each of which are mounted parallel links 42 and 43, respectively, so that these parallel links have an annular movement above the axis of the shaft 30. At their free ends, these links 42 and 43 are united by an axle 44 on which are mounted two fixedly connected sprockets 45 and 46, respectively, the sprocket 45 being driven by sprocket chain 47, which sprocket 47 is driven by the sprocket wheel 33, and the sprocket wheel 46 drives the chain 48 which passes around a sprocket wheel 49 on a shaft 50 which has bearings 51 in the picker frame 52 and also in the parallel links 53 and 54 between which the chain 48 runs and which connect the axle 44 with the shaft 50. These links 42, 43, 54 and 55, together with the sprocket chains and sprocket wheels which rest between them, allow power to be transmitted from the shaft 30 to the shaft 50 even though the picker frame 52 be raised or lowered, this raising or lowering making no difference in the transmission of power.

The means by which the picker frame may be raised or lowered will be set forth below.

The sprocket wheel 32 carries a chain 56 which runs rearwardly of the machine to a sprocket wheel 57 fixedly mounted on a transversely extending shaft 58 that is journaled in suitable bearing blocks 59 at the rear of the frame and nearly over the axles of the wheels 4. Fixed collars 60 are mounted also on this shaft 58 and coil springs 61 are placed thereon and have one end bearing against the said collars 60 and the other ends move against crown collars 62 mounted in all respects the same as the collars 35 and for a similar purpose. These collars 62 have an annular groove, not shown, identical with that shown on the collars 35 and these grooves are engaged by lugs on the levers 63 and 64 respectively. The lever 63 is fulcrumed at 65, which fulcrum is supported rigidly on the frame 2 and this lever is connected by an arm 68 fixed to a shaft 69 journaled in bearings 70 fixed to one of the longitudinal sills of the frame 2. A second arm 71 is also fixed to the shaft 69 and is pivotally connected with an upright rod on which is a pedal 73.

The lever 64 is fulcrumed at 67 and at its outer end is pivotally connected to a link 66 which is also pivotally connected at its other end to an arm 74 on a shaft 75 journaled in the block 70 and parallel to the shaft 69. Another arm 76 is fixed on the shaft near the arm 71 on the shaft 69, and this arm 76 is connected with a vertically disposed rod 77 which supports a pedal 78 at its upper extremity. Beneath the pedal and surrounding the rod 77 is a coil spring 79 which rests against the flooring 80 beneath the seat 81. By depressing the pedals 73 and 78, respectively, the levers 63 and 64 are thrown so as to release the crown collars 62 from smaller collars on the sprocket wheels 82 and against the tension of the spring 61 and its sprocket 82.

The sprocket wheels 82 are mounted loosely on the shaft 58 and adapted to be engaged by the collars 62 exactly as the collars 35, above described, and engage the respective sprockets with which they are connected.

Sprocket chains 83 are driven by the wheels 82 and these chains 83 mesh with the sprocket wheels 84 fixed to the spokes of the wheels 4.

Idle wheels 85 mounted in any suitable way on the support 6 crowd the upper runs of the chain 83 together and keep this part of the chain out of the way at all times. From this it is apparent that under the action of the springs 61, the main shaft 30 through the sprocket chains and sprocket wheels will normally drive the shaft 58 and wheels 4. In going around a curve where it is necessary that one of the driving wheels revolve faster than the other, this can be accomplished by pressing on one of the pedals 73 or 78, either as may be desired. If the machine is to be stopped suddenly, the two pedals 73 and 78 may be depressed simultaneously and then the machine may be stopped instantly.

Figure 1:
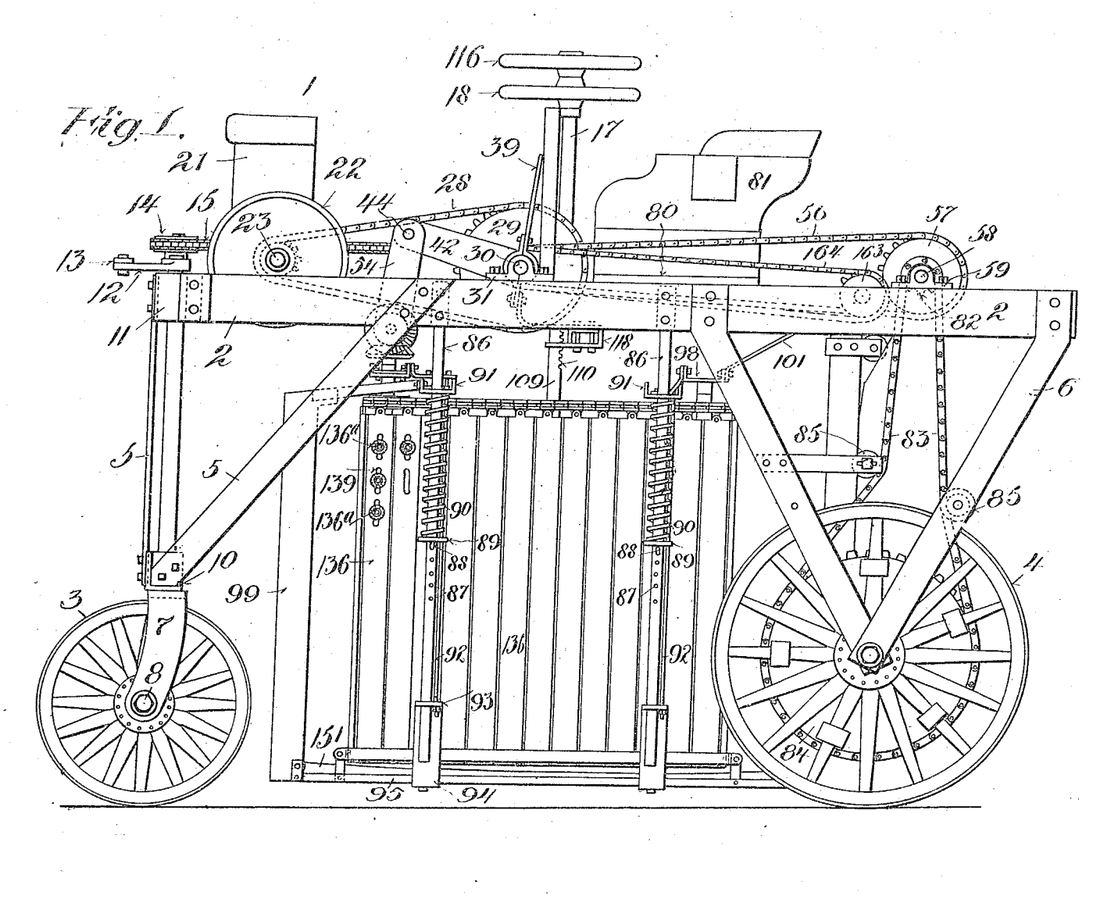
Figure 1 is a side elevation of a machine provided with my improvements.
Figure 2:
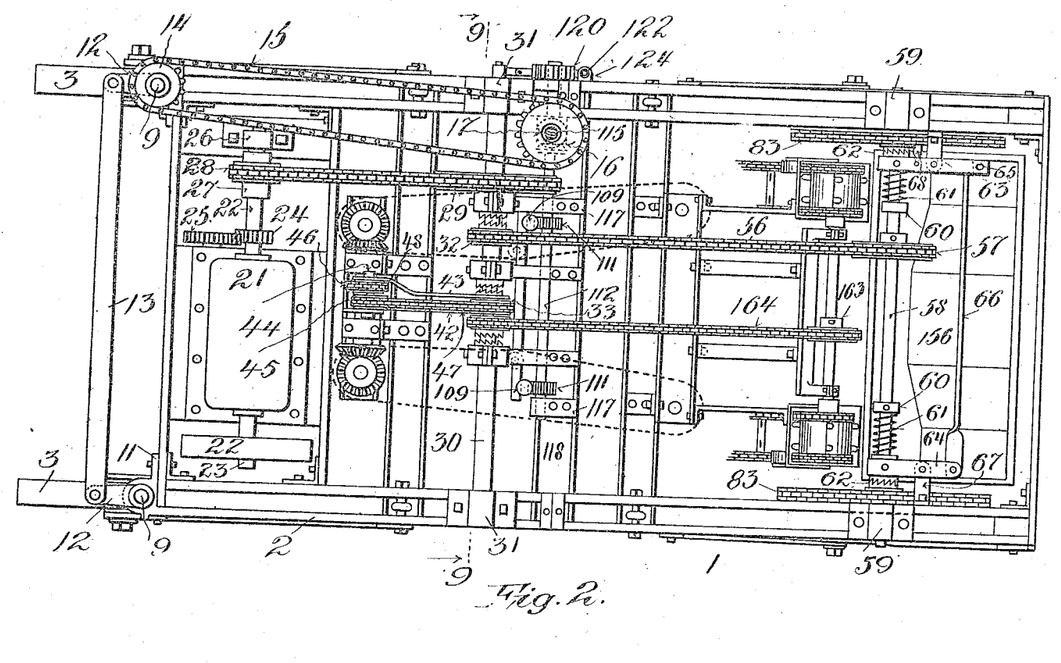
Fig. 2 is a plan view of the same.
Figure 3:
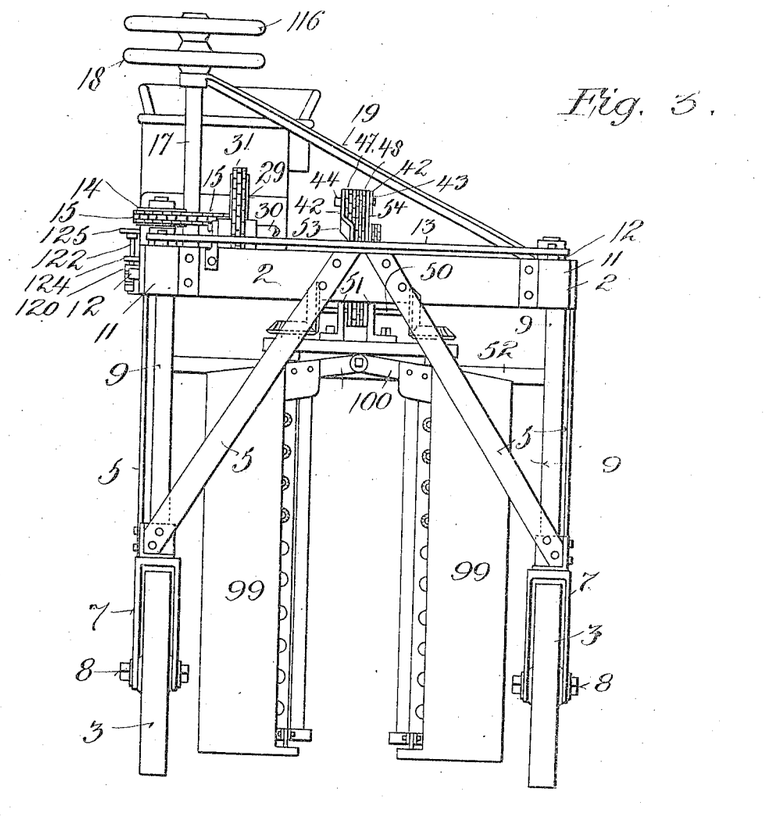
Fig. 3 is a front elevation.
Figure 9:
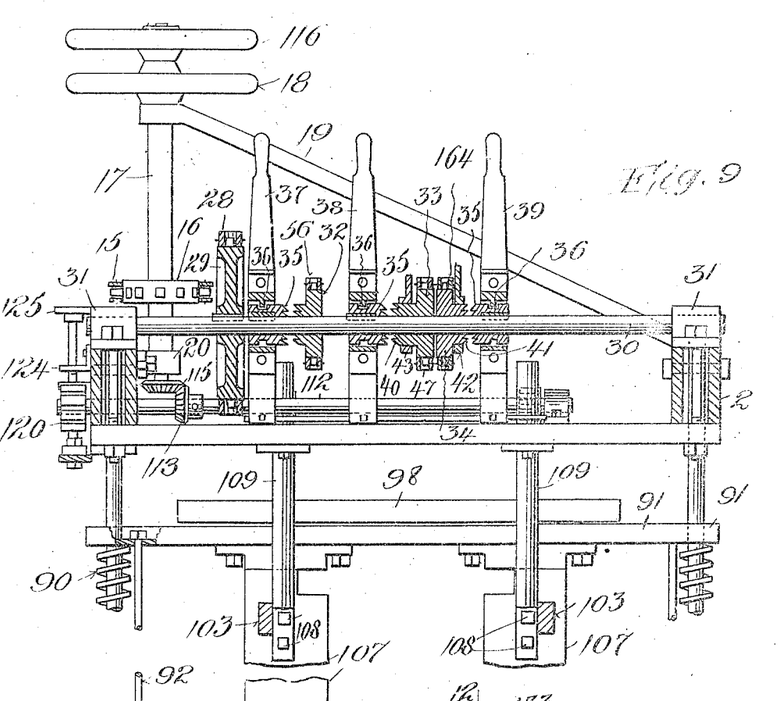
Fig. 9 is a sectional view taken on the line 9—9 of Fig. 2, looking in the direction of the arrows.
Figures 10, 11, 12:
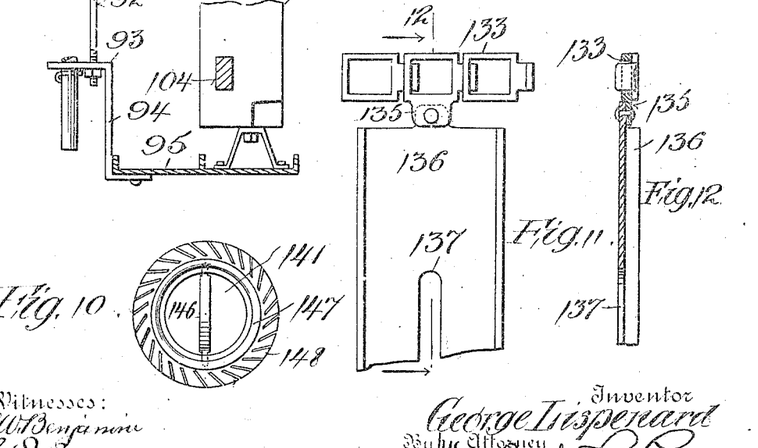
Fig. 10 is an end view of one of the pickers.
Figs. 11 and 12 are a side elevation and a sectional view, respectively, of the supports for the pickers, Fig. 12 being taken on the line 12—12 of Fig. 11, looking in the direction of the arrows.

Suspended from the longitudinal sills of the frame 2 are vertically disposed rods 86 which are in substantially the position indicated in Fig. 1 with regard to the other parts of the machine. These rods 86 are preferably circular in cross-section, although they may be given any desired shape, and are perforated in a number of places, as shown at 87. Through one of these perforations in each rod is passed a pin 88 and on this pin 88 rests a collar 89 which in turn supports one end of a coil spring 90 mounted on rod 86, and the upper end of each of these coil springs 90 supports the transverse channel bars 91 of the adjustable frame 52. These channel bars 91 are provided with suitable perforations through which the rods 86 are passed. Suspended from the channel irons 91 are rods 92 which pass through horizontally disposed flanges 93 of the Z-irons 94 which support the flooring 95 of the adjustable frames. The rods 92 are preferably made in the form of bolts, as shown in Fig. 9, so as to permit of proper adjustment. The channel irons 91 are also provided with suitable brackets 96 to which are secured a second set of channel irons 97 and 98, 97 being at the front of the adjustable frame and 98 at the rear. The guards 99 and the parts held in fixed relation thereto are supported by brackets 100 and 101 and the rear channel iron 98 respectively. The channel irons 91 also have vertically disposed bars 102 fixed to their horizontal webs and to the lower side thereof, which bars 102 extend clear to the flooring 95 and help to support the same. The bars 102 are united by their horizontally disposed and parallel bars 103 and 104, respectively, at the ends of which are journaled the vertically disposed shafts 105 and 106 respectively, which shafts pass through the front channel bar 97 and the rear channel bar 98, respectively, and are journaled therein as will more particularly appear below.

Figure 4:
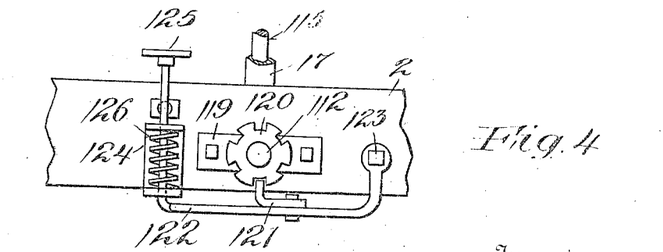
Fig. 4 is a detail of construction.

The parallel rods or bars 103 and 104 are united near their centers by a vertically disposed bar 107 which at its upper end is united by bolts 108 to a rack bar 109 which has teeth 110 which mesh with corresponding teeth on the pinion 111 fixedly mounted on the shaft 112, which shaft 112 has a bevel gear 113 and meshes with corresponding bevel gear 114 on a shaft 115 at the upper end of which is a hand wheel 116, the shaft 115 being within the shaft 17 and journaled in the block 20 at its lower end. The shaft 112 is journaled in suitable block 117 fixed on the frame 2 and preferably mounted on a transversely disposed channel beam 118 which runs under the lower edges of the longitudinal sills of the frame 2 and is preferably secured thereto. One end of the shaft 112 projects through one of the longitudinal sills of the frame 2 and to the exterior thereof through a plate fixedly mounted on said sill and the end of this shaft 112 has a notched wheel 120 fixed on said shaft (see Fig. 4), and this wheel 120 is connected by a pawl 121 fixed to a bar 122 pivoted at one end by a pivot 123 to the side frame 2 and its other end passes through a small section 124 of a channel iron, which section 124 is fixed to the frame 2. The upper end of the rod 122 terminates in a pedal 125. A spring 126 is secured at its upper end to the rod 122 and rests against the upper and horizontally disposed web of the channel iron 124 and its lower end rests against the lower and horizontally disposed web of the said channel iron 124 so that when the pedal 125 is depressed, the spring 126 is put under compression and then the pawl 121 is withdrawn from the notched wheel 120, the wheel 116 may then be turned and the rack bars 109 may be raised or lowered, the springs 90 acting as counterweights. If the springs 90 are too powerful so as to more than overbalance the weight of the movable frame 52, the wheel 116 will require more force to lower the movable frame 52 than to raise the same. If the reverse is the case, that is, if the springs 90 are not strong enough to have their tension more than overbalance the weight of the movable frame 52 more power will be required at the wheel 116 to lift than depress said movable frame. 52. The exact variation of the tension of the springs 90 is immaterial, provided it is not so great as to overpower the operator at the wheel 116. Compensation can always be made for excessive strength or weakness of the springs 90 by merely shifting the pins 88 in the holes 87 to correspond for any strength or weakness that may develop. From this it is apparent that the counterbalancing springs 90 can always be placed under approximately correct tension and the movable frame 52, with its attendant parts can always be adjusted so as to compensate for the different levels at which the cotton bolls may grow on the plants and this adjustment may be made at any time while the machine is not in use by merely pressing on the pedal 125 and thereby releasing the pawl 121 and then turning the handle 116. When the pickers are in the correct position, the pressure of the treadle 125 is relieved and then the pawl 121 will lock the notched wheel 120 so as to prevent all rotation thereof until the operator sees fit to again re-adjust the position of this movable frame 52.

The upper ends of the shafts 105 carry bevel gears 105$^a$ which mesh with similar gears 50$^a$ on the shaft 50 and through these the pickers and picker belts are driven. The shafts 105 and 106 are journaled in any suitable bearings. The bars 102 and 107 are also provided with bolt slots 127 which are so arranged as to take and permit the same to be inserted and then moved along the slot and held at any point between the ends of the slots. These slots 127 run parallel to the axis of the respective bars. These slots 127 carry bolts 128 in which are mounted Z-angle metal bars 129 and 130 respectively, the bars 129 being provided with teeth, and the bars 130 being made smooth for reasons which will appear below.

On the forward run of the pickers which is outside the plane of the axes 105 and 106, the teeth extend upwardly and are below the pinions with which they mesh, and on the inside run the reverse is the case. In other words, while the pickers are drawing the cotton from the bolls, they are rotated by rack bars which have teeth extending downwardly and on the forward run of the pickers, when they are discharging the cotton after being picked, the pickers are rotated by teeth which extend upwardly, and so rotate in the opposite direction.

By making the Z-bars and mounting them as shown, the gears of the pickers are protected from lint and dirt while the machine is in operation.

The shafts 105 and 106 are each provided with suitable sprocket wheels, upper and lower, 131 and 132, respectively, which sprockets are fixed on their respective shafts, the sprockets 131 being connected by chain 133 and the sprockets 132 by chain 134. Alternate links of the chains 133 and 134 are provided with lugs 135 and these lugs are united by housings 136 on which the pickers 136$^a$ are mounted. The chains 133 and 134 and the housings 136 which unite these chains together with the parts carried thereby which will be described below are, the picker belts. The pickers 136$^a$ on these belts are all identical and all mounted and carried in the same identical way so that a description of one will answer for all. They are arranged in both horizontal and vertical rows, as many of each as desired.

Figures 13, 14, 15, 16:
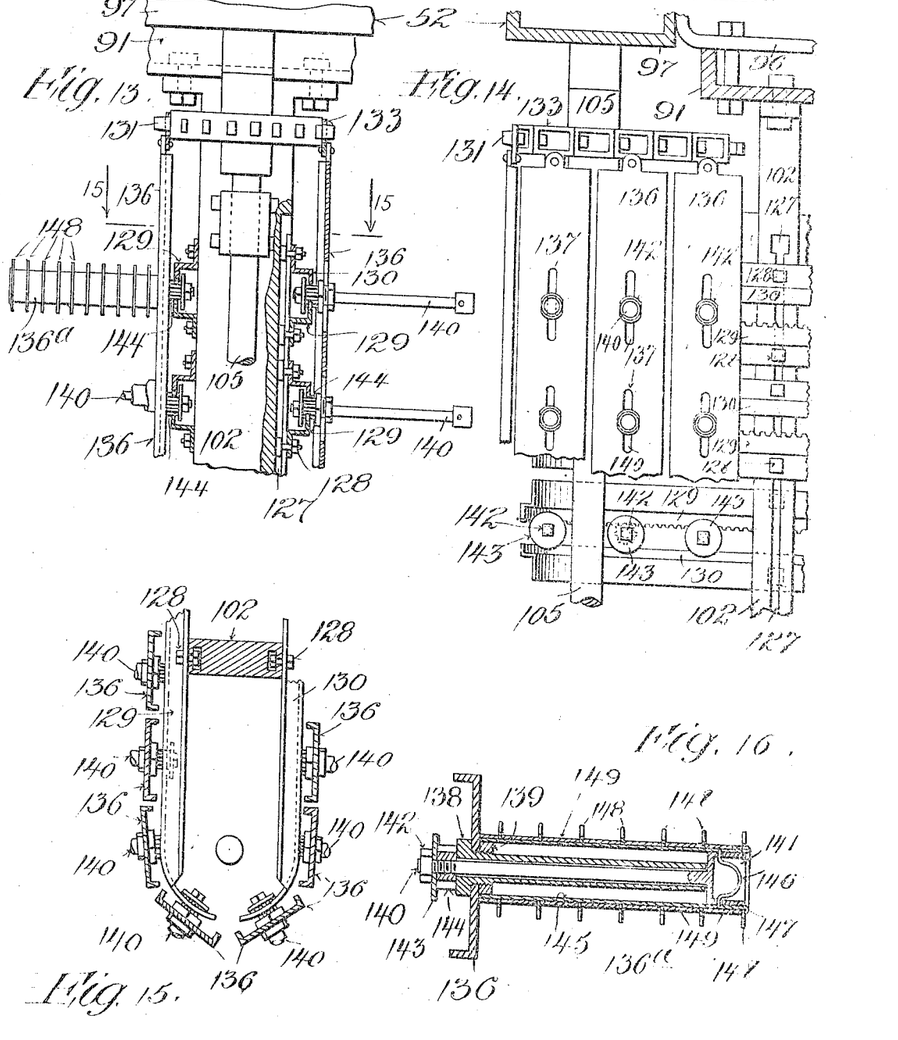
Fig. 13 is an end elevation of the pickers and their supports, parts being shown in section.
Fig. 14 is a side elevation of the structure shown in Fig. 13.
Fig. 15 is a sectional view taken on the line 15—15 of Fig. 13, looking in the direction of the arrows.
Fig. 16 is a longitudinal section of the picker shown in Fig. 10 and shows also a part of the support for the same.

Each housing 136 is provided with a number of slots 137 through which protrudes the fixed bushing 138 securely held in place by a lock nut 139. A spindle 140 rotates freely in said bushing 139 and is provided at its outer end with a cup 141. At its inner end it is provided with a nut 142 and a washer 143 and next the washer 143, and sandwiched in between it and the bushing 138, is a pinion 144. A cylinder 145 rests on the lock nut 139 and rotates freely therein and also rests on the cup 141 to which it is fixed by means of a spring 146 which passes through perforations in the walls of said cup and into said cylinder 145 thereby locking it to the spindle 140 so that the cylinder 145 and the spindle 140 have no relative movement to each other but always have the same angular movement. The cylinder 145 has its outer end slightly crimped to form a shoulder 147 and against this shoulder is a slitted wheel 148, this wheel being held true on the cylinder 145 by a bushing 149. The slitted wheel 148 and the bushing 149 being repeated at intervals, as shown in Fig. 16, and as often as desired. The pinions 144 mesh with the rack-bars 129 and rub against the guides 130 and this is true even when these guides and rack-bars are curved as shown in Fig. 15.

Figure 6:
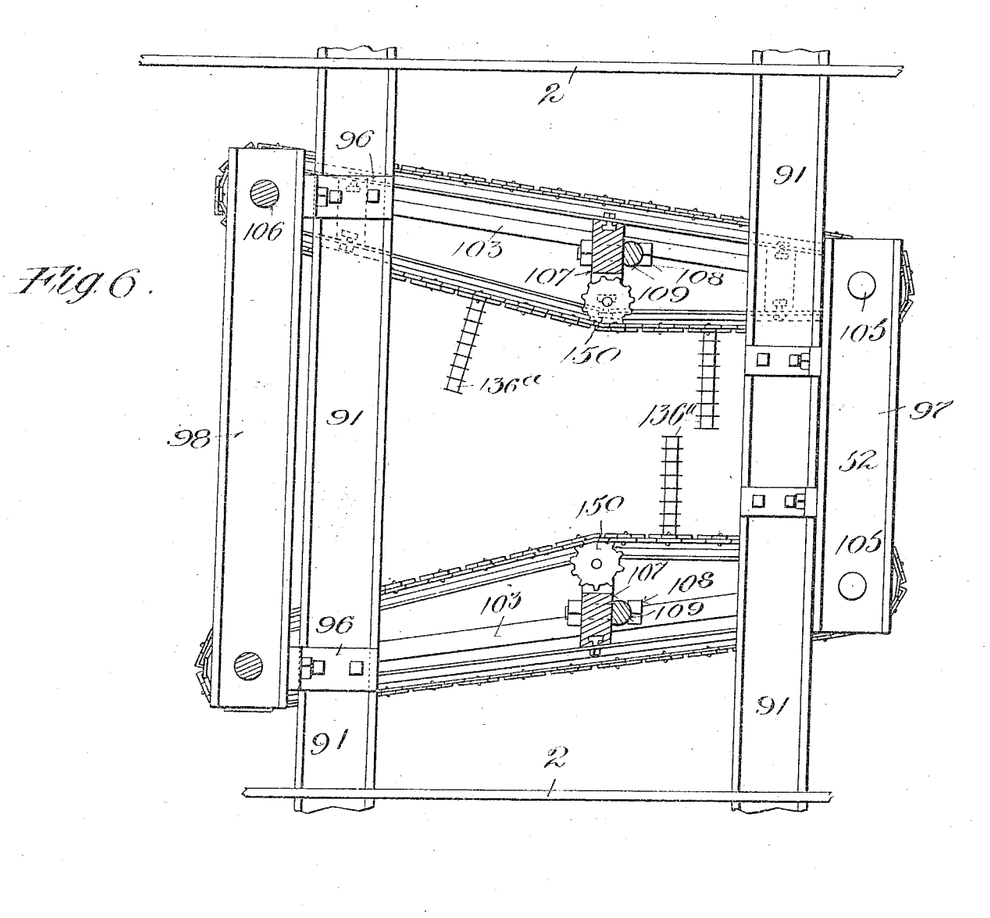
Fig. 6 is a plan view, partially in section, of the pickers and their mounting.
Figure 7:
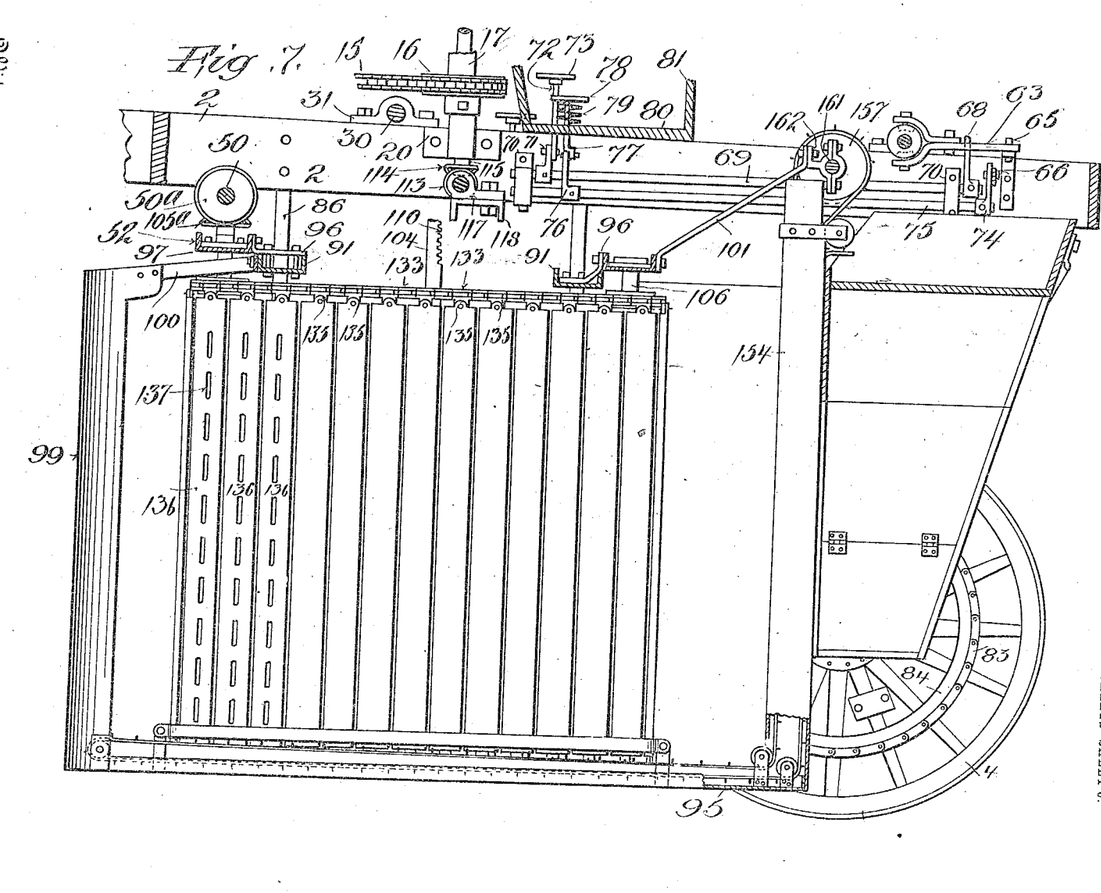
Fig. 7 is a side elevation, partially in section, of the same, the pickers being omitted.
Figure 8:
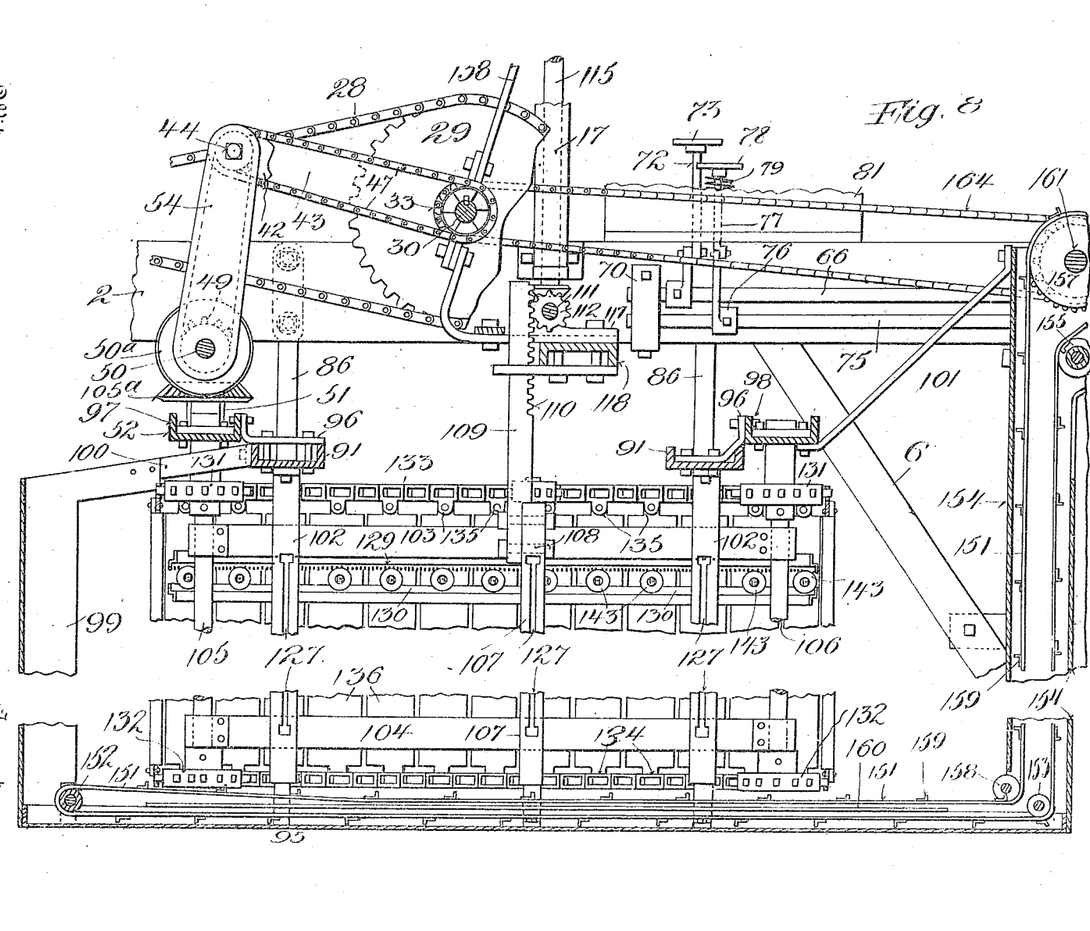
Fig. 8 is an enlarged sectional view, partially broken away, of the structure shown in Fig. 7, but taken on a different line.

The upper and lower ends of the bars 107 are provided with sprocket wheels 150 which mesh with the chains 133 and 134 respectively, the object of this being to cause the run of the belts while operating on the cotton plants to move for a time parallel to each other and after this parallel movement to diverge as shown in Fig. 6. The rack bars 129 and the guides 130 are also mounted as shown in said figure so as to correspond to the inside run of the belts. The sprocket wheels are so proportioned that the machine moves forward with substantially the same velocity as the picking belts move rearwardly on their inner runs and while the pickers are actively engaged in picking cotton so that the picker belts are parallel while the pickers are making about seven or eight revolutions and then diverge so as to have a movement away from the plant being picked in the direction of the axis of each picker or nearly in this direction. The curving of the rack bars as shown in Fig. 15 and also in Fig. 14 enables the pickers to become operative before they reach the position where the belts run parallel. The picker belts are so arranged relatively to each other that the pickers have their axes out of alinement while that part of the belt which bears the pickers are in parallel relation to each other so that a plant will always have room to swing from a picker on one belt to a picker on the other belt, and can in no instance get jammed in the ends of the pickers.

The forward run of the picker belts has the rack bars 129 below the pinions 144 so that the direction of the rotation is reversed on the forward run, which reversal causes each picker to drop its cotton which falls on the conveyer belt 151, the upper run of which conveyer runs forward to a point just in the rear of the guards 99 where it passes over a pulley 152 suitably mounted on the floor 95 and then passes rearwardly to another pulley 153 and from thence vertically in a well 154 to another pulley 155, and from thence rearwardly and upwardly and over a box 156 into which the cotton falls and from thence over a pulley 157 and down through the well 154 and thence forward to the pulley 152. The surface of the belt 151 which engages the cotton has transversely extending angles 159 which positively move the cotton first forward, then to the rear and thence upward through the well 154 to the point where the cotton falls into the receptacle 156. The pulleys 152, 153 and 157 are ordinary pulleys with cylindrical faces and the pulleys 155 and 158 are grooved in their faces so as to allow the angles 159 to pass without obstruction. The upper run of the belt 151 passes over a guide 160 which will catch this belt if it sags too much and prevent it from rubbing against the lower run of the belt 151. The belt 151 is driven by the pulley 157 which is fixed on a transversely disposed shaft 161 mounted in suitable bearings 162 supported from the well 154 and the brace 101. The shaft 161 is driven by a sprocket wheel 163 which is fixed thereon and which is driven by a chain 164 which also meshes with the sprocket wheel 34 on the main driving shaft 30.

The engine 21 is provided with any suitable reversing gear, not shown, and with any suitable regulating gear or mechanism which may be of any well-known or conventional type, not shown, so that the machine may be run at any suitable speed, either forward or back just as is the case with any automobile.

Figure 5:
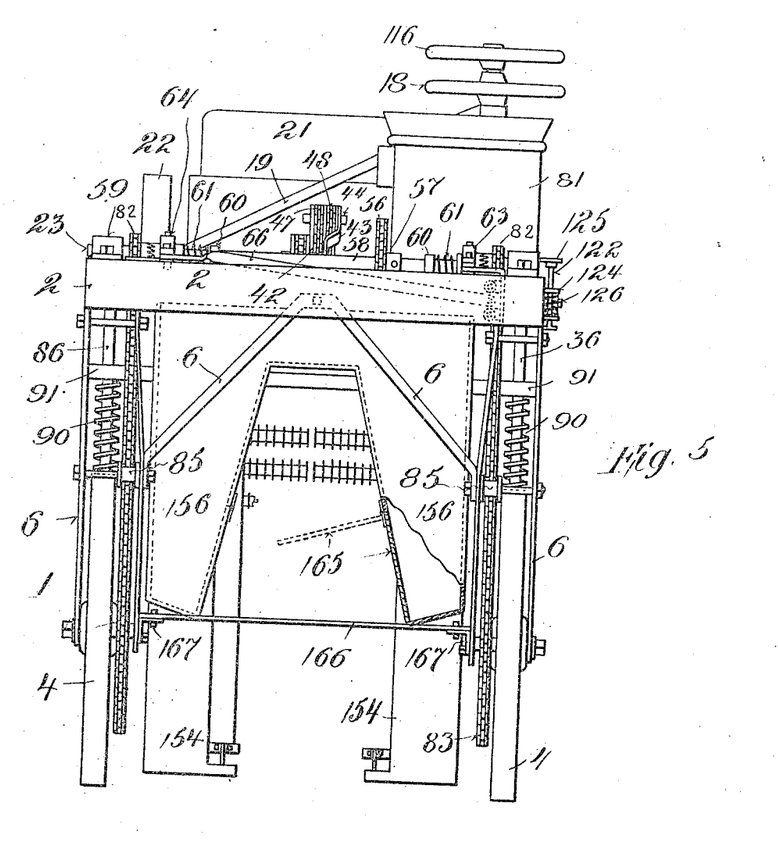
Fig. 5 is a rear elevation.

The box 156 in which the cotton is placed by the belt 151 is provided with suitable doors 165 hinged or mounted in any suitable manner, but preferably as shown in Fig. 5, so that the cotton may be conveniently withdrawn from time to time, as may be desired.

To further strengthen and stiffen the frame of the machine when not harvesting, but when being run, the braces 6 are united by a cross rod 166 which is united to said braces 6 by suitable angles 167 by bolts. The brace 166 is removed before the harvester enters a row of plants.

The operation of this machine is as follows:—The operator sits on the seat 81 and steers by the wheel 18 and controls the engine by any suitable means, not shown, so as to drive the machine so that it will straddle a row of cotton plants on which the pods or bolls have opened sufficiently to allow the ripe cotton to protrude. The mechanism for operating the pickers 136ª is then thrown in by means of the clutch lever 38 and the wheel 116 is used as above described, if necessary, to give the cotton picking belts their proper vertical adjustment as to height. Assuming all parts to be adjusted properly, the machine is then moved forward and the bushes have their parts crowded together by the guards 99. As soon as the guards 99 pass the bushes the parts, such as the plants and bolls and leaves, which have just been crowded and compressed react because of their elasticity and fly outward and as this occurs these parts come in contact with the pickers which at that time are being rotated by the curved portions of the racks 129 and these pickers have their axes nearly parallel with the longitudinal axis of the machine. While still rotating, these pickers 136ª move near the bush with a radial movement and rearwardly about as fast as the machine advances so as to be very near the bush or plant and while being so near the plant these pickers are rotated, and these pickers finally assume a position at substantially right angles to the position occupied at the beginning of the curved portion of the rack 129, and while in this position, with the runs of the belts in parallel relation, several revolutions are made without any relative change in position between the plant and the picker, thereby giving each individual picker ample opportunity to collect any lint which may protrude from any boll within its reach. The bolls which are not ripe and the flowers and leaves and other parts of the plant are not injured or interfered with by those pickers in any way except to be slightly bent away from the picker or pickers, as the case may be. After making several revolutions near the plant at that part of the belt where it runs parallel to the other belt, the pickers pass on to the diverging portions of the belt carried in the rear of the parallel portions and at the turn between the parallel and the diverging portion of the pickers is given a slight radial movement which gives a radial sweep to each individual picker, thereby causing it to shift its position slightly and to engage any cotton that may have been within reach and escaped therefrom. As the machine progresses along the row and after the picker has passed the parallel portion of the belt and entered on the divergent portions, as above described, it is then gradually withdrawn from the plant, because of this divergence, and it is withdrawn approximately but not exactly in the direction of the axis of the picker so as to reach the outlying portions of the plant, away from the stem, and so as to gradually withdraw from the plant without injuring it in any way except to withdraw its ripe cotton. This ripe cotton which has been gathered by the pickers is passed from one picker to another upwardly and rearwardly and tends to accumulate on the top row of pickers near the rear of the run of the picker belts and remains there until the pickers have been swung around to the forward run when their direction of rotation is reversed thereby causing the direction of movement of the cotton to be reversed which is downwardly and forwardly until all cotton is removed from the pickers and falls on the belt 151, where it is carried forward on the forward run of this conveyer belt and then rearwardly and then upwardly through the well 154 and into the receptacle 156 where it accumulates until removed through the openings left by the doors 165 when they are open.

The machine is thrown out of operation by shifting the lever 38, as described above, and also the lever 39, the lever 39 should always be thrown before the lever 38 when the machine is put into its operative condition, that is its condition for harvesting, and should always be thrown after the lever 38 and a few minutes thereafter, so as to give the belt 151 ample opportunity to clear the machine of all cotton, when the machine is put into its inoperative condition.

From the foregoing it is obvious that various embodiments of my invention may be made, all of which employ its essential characteristics, as pointed out in the annexed claims.

Having described my invention, what I claim is:—

1. A cotton harvester comprising a vehicle, cotton picking belts, bars for raising and lowering the said belts, a rack and pinion device for raising said bars simultaneously and resilient means for pendently supporting said belts.

2. In a cotton harvester, a vehicle, belt frames, cotton picking belts carried by said frames, resilient means for supporting said frames, vertical bars connected with the frames and each provided with a rack, a horizontal shaft having a plurality of pinions connected with the racks on the said bars and means for operating said shaft whereby the belt frames may be raised and lowered in unison.

3. In a cotton harvester, a vehicle having horizontal side sills, rods depending from the said sills provided with springs, belt frames, a plurality of cotton picking belts carried upon said belt frames, the said belt frames being supported from the said springs.

4. In a cotton harvester, the combination of a vehicle, and a picking belt adapted to be raised and lowered on the vehicle, a driving shaft, means for transmitting motion from the driving shaft to the picker belt comprising a jointed arm with mechanism thereon, means for transmitting motion from the operating shaft to the mechanism on the joint of said arm, and means for transmitting motion from the mechanism on the joint to the picking belt, and resilient means for supporting the belt independently of the other parts.

5. In a cotton harvester, the combination of a vehicle, and a picking belt supported by the vehicle and adapted to be raised and lowered thereon, a driving shaft, means for transmitting motion from the shaft to the belt comprising an arm journaled on the driving shaft, and a second arm fulcrumed to the first arm, mechanism on the joint of said arms, means for transmitting motion from the driving shaft to the mechanism at the connection of the second arms, means for transmitting motion from the said point of fulcrum to the picking belt, and resilient means for pendently supporting said belt.

6. In a cotton harvester, the combination of a vehicle, a picking belt carried by the vehicle adapted to be raised and lowered thereon, a driving shaft, means for transmitting motion from the shaft to the said belt consisting of a sprocket on said shaft, an arm journaled upon the driving shaft and having its free end connected to a second arm by means of a shaft, a plurality of sprocket wheels on said latter shaft, a sprocket wheel on the other end of the said second arm, a chain adapted to transmit motion from the driving shaft to the joint of said arms, and another chain adapted to transmit motion from the joint to the sprocket wheel at the opposite end of the said second arm, means of transmitting motion therefrom to the picking belt, and resilient means pendently supporting said belt from the vehicle.

7. In a machine of the class described, picker belts with pickers thereon and means for carrying the same and means for driving the same, racks adjacent to said belts and pinions on said pickers engaging said racks, said carrying and driving means being so arranged that said pickers first move in straight lines parallel to each other and then in straight lines divergent to each other.

8. In a machine of the class described, pickers and belts carrying the same, means for driving said belts, curved and straight racks near said belts, pinions on said pickers adapted to engage both the curved and straight portions of said racks, said carrying and driving means being so arranged that said pickers first move in straight lines parallel to each other and then in straight lines divergent to each other.

9. In a machine of the class described, pickers, belts carrying said pickers so that said picker belts will be parallel in part and diverge in part in straight lines on their picking runs, curved and straight rack bars mounted near said belts so as to be near said belts at all times, and pinions on said pickers adapted to engage said rack bars.

10. In a machine of the class described, a frame and means for carrying the same, an adjustable frame carried by the other frame and supported thereby, vertically compressible resilient counterbalancing means, picker belts supported by said adjustable frame, means for driving said picker belts, pickers on said picker belts and means for driving the same, said picker belts being parallel in part and divergent in part on their operative runs and guards adapted to compress a cotton plant, said guards being secured to said adjustable frame.

11. In a machine of the class described, guards and means for carrying the same, picker belts and resilient means for carrying the same, said picker belts being located immediately behind said guards, pickers extending from said picker belts and means for driving said pickers, said means being so arranged and disposed and said picker belts being so mounted that the pickers will become operative immediately in the rear of said guards and while pointed forwardly and will continue operating during the rearward runs of said belts.

12. In a machine of the class described, guards and means for vertically adjusting the same, pickers and means for mounting said pickers so that they will always be immediately in the rear of said guards when first entering their operative position, belts carrying said pickers and means for supporting the same, means for driving the said belts, means for driving said pickers, the parts being so constructed that the pickers become operative on the rearward run of said belts immediately behind said guards and continue operating while said belts are parallel to each other and while they diverge from each other on said rearward run.

13. A picker comprising a spindle, a cup at one end thereof, a cylinder mounted on said cup, slitted wheels on said cylinder and spacing sleeves separating said wheels.

14. A picker comprising a spindle, a cup at one end thereof, a cylinder mounted on said cup, slitted wheels and spacing sleeves mounted on said cylinder, and a spring passing through said cup and into said cylinder for holding same in place.

Signed this 19th day of December, 1907.

GEORGE LISPENARD.

Witnesses:
O. E. EDWARDS, Jr.,
G. I. ARONOW.